United States Patent
Pakkanen et al.

(10) Patent No.: US 10,082,228 B2
(45) Date of Patent: Sep. 25, 2018

(54) CROSS-LINKED POLYETHYLENE PIPE

(75) Inventors: Anneli Pakkanen, Vasterskog (FI);
Magnus Palmlöf, Vastra Frolunda (SE);
Jeroen Oderkerk, Stenungsund (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/127,036

(22) PCT Filed: Oct. 30, 2009

(86) PCT No.: PCT/EP2009/007786
§ 371 (c)(1),
(2), (4) Date: Aug. 24, 2011

(87) PCT Pub. No.: WO2010/049170
PCT Pub. Date: May 6, 2010

(65) Prior Publication Data
US 2011/0318516 A1  Dec. 29, 2011

(30) Foreign Application Priority Data

Oct. 31, 2008  (EP) .................... 08253569

(51) Int. Cl.
| | |
|---|---|
| B32B 1/08 | (2006.01) |
| B29C 47/00 | (2006.01) |
| B29C 35/08 | (2006.01) |
| F16L 9/12 | (2006.01) |
| F16L 11/04 | (2006.01) |

(52) U.S. Cl.
CPC ............ F16L 9/12 (2013.01); F16L 11/04 (2013.01); *Y10T 428/139* (2015.01)

(58) Field of Classification Search
CPC .... F16L 11/04; F16L 9/12; B32B 1/08; Y10T 428/139
USPC .......... 428/36.92, 36.9; 522/129; 524/585; 526/348.2, 352, 387, 65, 348; 137/1; 264/209.1
See application file for complete search history.

(56) References Cited

U.S. PATENT DOCUMENTS

| | | | |
|---|---|---|---|
| 5,317,036 A * | 5/1994 | Brady, III | B01J 8/24 523/223 |
| 5,998,558 A * | 12/1999 | Wasserman | C08F 210/16 526/160 |
| 6,380,328 B1 | 4/2002 | McConville et al. | |
| 7,129,296 B2 * | 10/2006 | Van Dun | C08F 10/02 525/191 |
| 7,193,017 B2 * | 3/2007 | Kwalk | C08L 23/04 525/191 |
| 2004/0045619 A1 * | 3/2004 | Backman | F16L 9/121 138/137 |
| 2004/0167293 A1 * | 8/2004 | Palmlof et al. | 525/342 |
| 2005/0031813 A1 | 2/2005 | Conrnette et al. | |
| 2007/0048472 A1 | 3/2007 | Krishnaswamy et al. | |

FOREIGN PATENT DOCUMENTS

| | | | | |
|---|---|---|---|---|
| EP | 1574772 A1 | 9/2005 | | |
| EP | 1341826 B1 | 3/2006 | | |
| EP | 1927626 | 6/2008 | | |
| EP | 1927627 | 6/2008 | | |
| EP | 1950241 | 7/2008 | | |
| EP | 2285897 B1 | 2/2011 | | |
| EP | 2285893 B1 | 9/2011 | | |
| FI | EP 1655334 A1 * | 5/2006 | ............ | C08F 210/16 |
| FI | EP 1927627 A1 * | 6/2008 | ............. | C08L 23/06 |
| JP | 10193468 | 7/1998 | | |
| JP | 11320651 | 11/1999 | | |
| JP | 2000009265 | 1/2000 | | |
| WO | WO 2000/01765 | 1/2000 | | |
| WO | WO 01/053367 | 7/2001 | | |
| WO | WO 02/046297 A2 | 6/2002 | | |
| WO | WO 2005/095838 | 10/2005 | | |

OTHER PUBLICATIONS

International Search Report issued for PCT/EP2009/007786, dated Mar. 4, 2010.
International Search Report issued for PCT/EP2009/007783, dated Jan. 26, 2010.
International Search Report issued for PCT/EP2009/007784, dated Jan. 29, 2010.
International Search Report issued for PCT/EP2009/007785, dated Jan. 22, 2010.

* cited by examiner

*Primary Examiner* — Gerard T Higgins
*Assistant Examiner* — Kevin C Ortman, Jr.
(74) *Attorney, Agent, or Firm* — Knobbe, Martens, Olson & Bear, LLP

(57) ABSTRACT

A cross-linked polyethylene pipe comprising an ethylene polymer with a density of at least 948 kg/m³ obtained by polymerization with a single-site catalyst and having a shear thinning index $SHI_{2.7/210}$ of less than 10; and wherein said pipe has a pressure test at 4.8 MPa and 95° C. of at least 500 h and at 12.4 MPa and 20° C. of at least 500 h.

8 Claims, No Drawings

CROSS-LINKED POLYETHYLENE PIPE

RELATED APPLICATIONS

This application is a U.S. National Phase of International Application No.: PCT/EP2009/007786, filed Oct. 30, 2009, designating the U.S., and published in English as WO 2010/049170 on May 6, 2010, which claims the benefit of European Application No. 08253569.1 filed Oct. 31, 2008.

FIELD OF THE INVENTION

This invention concerns a process for the manufacture of a cross-linked polyethylene pipe as well as the cross-linked pipe itself and the use thereof in the transport of high pressure fluids such as water.

BACKGROUND OF THE INVENTION

The use of polymers for pipes for various purposes, such as fluid transport, e.g. transport of liquids or gases such as water or natural gas is known. It is common for the fluid to be pressurised in these pipes. Such pipes can be made of polyethylene such as medium density polyethylene (MDPE) or high density polyethylene (HDPE), typically having density of about 950 kg/m$^3$.

Pipes can be manufactured using various techniques such as RAM extrusion or screw extrusion. Screw extrusion is one of the core operations in polymer processing and is also a key component in many other processing operations. An important aim in a screw extrusion process is to build pressure in a polymer melt so that it can be extruded through a die.

Crosslinking improves parameters such as heat deformation resistance and therefore pipes for hot water applications, such as pipes for floor heating, or for hot water distribution, are usually made of crosslinked polyethylene (PEX).

In order to improve the crosslinking response and hence reduce the consumption of crosslinking agent, e.g. peroxide, when crosslinking pipes of polyethylene, it is generally desired to use an ethylene polymer of relatively low melt flow rate (MFR), i.e. high molecular weight. However, this results in the drawback of poor processability, i.e. a reduced line speed at extrusion.

Another problem that may arise is insufficient melt strength when using polymers having a higher MFR in order to achieve better extrudability. In a pipe manufacturing system, where pipes are extruded and crosslinked in a separate system, melt strength is required to keep dimensional stability of the partly molten, uncrosslinked pipe until it becomes crosslinked. In the worst case, lack of melt strength means that it may not be possible to prepare a pipe from the polymer, because the polymer parison collapses when it exits from the extruder. Higher MFR resins also have poorer crosslinkability, which means that a larger amount of crosslinking agent or a stronger irradiation dose must be used.

SUMMARY OF THE INVENTION

It is generally difficult therefore to achieve good processability and sufficient cross-linkability in the same polymer. The present inventors sought to solve the problems of good cross-linking ability combined with good processability, in particular in a screw extrusion process.

In EP-A-1574772, the inventors suggest the use of certain polyethylene resins for cross-linked pipe manufacture. The invention employs lower density polymers than are typically used in pipe manufacture but which are made by single site catalysis to improve processability.

It is an object of the present invention to provide a polyethylene resin which can be formed into a pipe of very high strength. The present invention aims to provide a crosslinked polyethylene pipe which is able to withstand high internal overpressures and which are cross-linked using irradiation rather than peroxide. Such pipes can be used for transportation of fluids under high pressure.

Thus viewed from a first aspect the invention provides a cross-linked polyethylene pipe comprising an ethylene polymer with a density of at least 948 kg/m$^3$ obtained by polymerisation with a single-site catalyst and having a shear thinning index SHI$_{2.7/210}$ of less than 10; and wherein said pipe has a pressure test performance at 4.8 MPa and 95° C. of at least 500 h and at 12.4 MPa and 20° C. of at least 500 h (ISO 1167).

Viewed from another aspect the invention provides a process for the preparation of a crosslinked ethylene polymer pipe comprising forming the ethylene polymer as hereinbefore described into a pipe by extrusion, especially screw extrusion and crosslinking it.

Viewed from another aspect the invention provides a process for the preparation of a crosslinked ethylene polymer pipe comprising extruding an ethylene polymer with a density of at least 948 kg/m$^3$ obtained by polymerisation with a single-site catalyst and having a shear thinning index SHI$_{2.7/210}$ of less than 10; and into a pipe;

irradiating said pipe so as to crosslink it so as to form a pipe which has a pressure test performance at 4.8 MPa and 95° C. of at least 500 h and at 12.4 MPa and 20° C. of at least 500 h.

Viewed another aspect the invention provides a process for the preparation of a pipe as hereinbefore defined comprising:

(I) polymerising ethylene and optionally at least one comonomer in a first stage in the presence of a single site catalyst;

(II) polymerising ethylene and optionally at least one comonomer in a second stage in the presence of the same single site catalyst;

so as to form an ethylene polymer as hereinbefore described, extruding said polymer into a pipe and cross-linking said pipe by irradiation so as to form a pipe which has a pressure test performance at 4.8 MPa and 95° C. of at least 500 h and at 12.4 MPa and 20° C. of at least 500 h.

DETAILED DESCRIPTION OF THE EMBODIMENTS

Ethylene Polymer

The cross-linked pipes of the invention are manufactured using an ethylene polymer. By ethylene polymer is meant a polymer in which ethylene is the major repeating unit, e.g. at 70 wt % ethylene, preferably at least 85 wt % ethylene.

The ethylene polymer of the present invention has a density of at least 948 kg/m$^3$. A preferred density range may be 948-958 kg/m$^3$. Preferably density can be more than 950 kg/m$^3$.

The ethylene polymer of the invention preferably has a MFR$_{21}$ of less than 15 g/10 min, more preferably less than 11 g/10 min, especially 2 to 10 g/10 min, e.g. 3 to 9 g/10 min.

The MFR is an indication of the flowability, and hence the processability, of the polymer. The higher the melt flow rate, the lower the viscosity of the polymer. MFR is also important to ensure sufficient cross-linking ability.

$MFR_5$ values may range from 0.01 to 5 g/10 min. Ideally the $MFR_5$ value is in the range 0.1 to 2 g/10 min.

The ethylene polymers of the invention preferably have molecular weight, $M_w$ of at least 100,000, preferably at least 120,000, especially at least 150,000, e.g. at least 175,000.

$M_n$ values are preferably at least 25,000, more preferably at least 30,000.

The preferably single-site catalysed ethylene polymer of the present invention has a broad molecular weight distribution as defined by its shear thinning index (SHI). The SHI is the ratio of the complex viscosity ($\eta^*$) at two different shear stresses and is a measure of the broadness (or narrowness) of the molecular weight distribution.

According to the present invention the ethylene polymer has a shear thinning index $SHI_{5/300}$, i.e. a ratio of the complex viscosity at 190° C. and a shear stress of 5 kPa ($\eta^*_{5kPa}$) and the complex viscosity at 190° C. and a shear stress of 300 kPa ($\eta^*_{300kPa}$), of less than 20, preferably less than 10, especially less than 8.

According to the present invention the ethylene polymer has a shear thinning index $SHI_{2.7/210}$, i.e. a ratio of the complex viscosity at 190° C. and a shear stress of 2.7 kPa ($\eta^*_{2.7kPa}$) and the complex viscosity at 190° C. and a shear stress of 210 kPa ($\eta^*_{210kPa}$), of less than 10, e.g. 2 to 7. Especially preferably the $SHI_{2.7/210}$ is less than 5.

Another way to measure molecular weight distribution (MWD) is by GPC. The molecular weight distribution (MWD value i.e. $M_w/M_n$) according to the present invention less than 10, preferably less than 7.5, especially less than 5. The narrow molecular weight distribution enhances crosslinkability, e.g. less peroxide or radiation is required to obtain a certain crosslinking degree.

According to a preferred embodiment of the invention the ethylene polymer has a complex viscosity at a shear stress of 5 kPa/190° C., $n^*_{5kPa}$, of at least 20,000 Pas, more preferably at least 25,000 Pas.

According to another preferred embodiment of the invention the ethylene polymer has a complex viscosity at a shear stress of 0.05 rad/s at 190° C., ($n^*_{0.05rad/s}$) of at least 20,000 Pas, more preferably at least 27,000 Pas.

The ethylene polymer of the invention can be unimodal or multimodal. A unimodal polymer possesses a single peak in the GPC curve and is formed in a single step. The term unimodal means unimodal with respect to molecular weight distribution.

A multimodal ethylene polymer of the invention is produced in at least two stages, ideally two stages only, and therefore contains at least two fractions, preferably two fractions only.

The term "multimodal" means herein, unless otherwise stated, multimodality with respect to molecular weight distribution and includes therefore a bimodal polymer. Usually, a polyethylene composition, comprising at least two polyethylene fractions, which have been produced under different polymerization conditions resulting in different (weight average) molecular weights and molecular weight distributions for the fractions, is referred to as "multimodal". The prefix "multi" relates to the number of different polymer fractions present in the polymer. Thus, for example, multimodal polymer includes so called "bimodal" polymer consisting of two fractions. The form of the molecular weight distribution curve, i.e. the appearance of the graph of the polymer weight fraction as a function of its molecular weight, of a multimodal polymer will show two or more maxima or is typically distinctly broadened in comparison with the curves for the individual fractions. For example, if a polymer is produced in a sequential multistage process, utilizing reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions form typically together a broadened molecular weight distribution curve for the total resulting polymer product.

It is preferred if the ethylene polymer of the invention is multimodal especially bimodal, (i.e. two components only). It is also preferred however if the ethylene polymer of the invention comprises at least two components but is still unimodal. The term unimodal is used herein to mean that the GPC curve of the polymer contains a single peak. This means that the two components of the polymer are so similar, particularly in terms of molecular weight distribution, that they cannot be distinguished in a GPC curve.

The preferred ethylene polymer usable in the present invention comprises at least a first component and a second component. The first component is made in the earlier of any multistage process.

In one preferable embodiment, said multimodal polymer comprises at least (i) a first component which is an ethylene homopolymer or copolymer component, and (ii) a second component which is an ethylene homopolymer or copolymer component. Ideally both components are homopolymers of ethylene.

Alternatively, said multimodal ethylene polymer may comprise further polymer components, e.g. three components being a trimodal ethylene polymer. Optionally multimodal ethylene polymers of the invention may also comprise e.g. up to 10% by weight of a well known polyethylene prepolymer which is obtainable from a prepolymerisation step as well known in the art, e.g. as described in WO9618662. In case of such prepolymer, the prepolymer component is comprised in one of first or second components, preferably the first component, as defined above.

Said first component of the multimodal polymer preferably has a $MFR_2$ of at least 5 g/10 min, preferably below 100 g/10 min, e.g. up to 70 g/10 min.

The density of first component of said multimodal polymer may range from 930 to 980 kg/m³, e.g. 940 to 970 kg/m³, more preferably 945 to 965 kg/m³.

The first component of said multimodal polymer may form from 30 to 70 wt %, e.g. 40 to 60% by weight of the multimodal polymer with the second component forming 70 to 30 wt %, e.g. 40 to 60% by weight.

The second component of said ethylene polymer preferably has properties in the ranges presented above for the first component.

The ethylene polymer of the invention may be an ethylene homopolymer or copolymer. By ethylene homopolymer is meant a polymer which is formed essentially only from ethylene monomer units, i.e. is 99.9 wt % ethylene or more. It will be appreciated that minor traces of other monomers may be present due to industrial ethylene containing trace amounts of other monomers.

The ethylene polymer of the invention may also be a copolymer and can therefore be formed from ethylene with at least one other comonomer, e.g. $C_{3-20}$ olefin. Preferred comonomers are alpha-olefins, especially with 3-8 carbon atoms. Other comonomers of value are dienes. The use of dienes as comonomer increases the level of unsaturation in the polymer and thus is a way to further enhance crosslinkability. Preferred dienes are $C_{4-20}$-dienes where at least one double bond is at the 1-position of the diene. Especially preferred dienes are dienes containing a tertiary double bond. By the term "tertiary double bond" is meant herein a double bond that is substituted by three non-hydrogen groups (e.g. by three alkyl groups).

Preferably, the comonomer is selected from the group consisting of propene, 1-butene, 1-hexene, 4-methyl-1-pentene, 1-octene, 1,7-octadiene and 7-methyl-1,6-octadiene.

The polymers of the invention can comprise one monomer or two monomers or more than 2 monomers. The use of a single comonomer is preferred. If two comonomers are used it is preferred if one is an $C_{3-8}$ alpha-olefin and the other is a diene as hereinbefore defined.

The amount of comonomer is preferably such that it comprises 0-3 mol %, more preferably 0-1.5 mol % and most preferably 0-0.5 mol % of the ethylene polymer.

It is preferred however if the ethylene polymer of the invention comprises a two homopolymer components.

The polymer of use in the pipes of the invention is prepared by single-site catalysed polymerisation and has a narrow molecular weight distribution. The use of a single-site catalysed ethylene polymer gives better pressure test performance for a given density level than corresponding prior art materials. Further, the use of single site catalysed low MFR polymer allows a lower amount of crosslinking agent to be used to reach the desired degree of crosslinking. The polyethylene as defined above useful may be made using any conventional single site catalysts, including metallocenes and non-metallocenes as well known in the field, in particular metallocenes.

Preferably said catalyst is one comprising a metal coordinated by one or more η-bonding ligands. Such η-bonded metals are typically transition metals of Group 3 to 10, e.g. Zr, Hf or Ti, especially Zr or Hf. The n-bonding ligand is typically an $\eta^5$-cyclic ligand, i.e. a homo or heterocyclic cyclopentadienyl group optionally with fused or pendant substituents. Such single site, preferably metallocene, procatalysts have been widely described in the scientific and patent literature for about twenty years. Procatalyst refers herein to said transition metal complex.

The metallocene procatalyst may have a formula II:

(II)

wherein:

each Cp independently is an unsubstituted or substituted and/or fused homo- or heterocyclopentadienyl ligand, e.g. substituted or unsubstituted cyclopentadienyl, substituted or unsubstituted indenyl or substituted or unsubstituted fluorenyl ligand;

the optional one or more substituent(s) being independently selected preferably from halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ or —NR"$_2$, each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl; or e.g. in case of —NR"$_2$, the two substituents R" can form a ring, e.g. five- or six-membered ring, together with the nitrogen atom to which they are attached;

R is a bridge of 1-7 atoms, e.g. a bridge of 1-4 C-atoms and 0-4 heteroatoms, wherein the heteroatom(s) can be e.g. Si, Ge and/or O atom(s), wherein each of the bridge atoms may bear independently substituents, such as $C_{1-20}$-alkyl, tri($C_{1-20}$-alkyl) silyl, tri($C_{1-20}$-alkyl)siloxy or $C_{6-20}$-aryl substituents); or a bridge of 1-3, e.g. one or two, hetero atoms, such as silicon, germanium and/or oxygen atom(s), e.g. —SiR$^1_2$—, wherein each R$^1$ is independently $C_{1-20}$-alkyl, $C_{6-20}$-aryl or tri($C_{1-20}$-alkyl)silyl-residue, such as trimethylsilyl;

M is a transition metal of Group 3 to 10, preferably of Group 4 to 6, such as Group 4, e.g. Ti, Zr or Hf, especially Hf;

each X is independently a sigma-ligand, such as H, halogen, $C_{1-20}$-alkyl, $C_{1-20}$-alkoxy, $C_2$-$C_{20}$-alkenyl, $C_2$-$C_{20}$-alkynyl, $C_3$-$C_{12}$-cycloalkyl, $C_6$-$C_{20}$-aryl, $C_6$-$C_{20}$-aryloxy, $C_7$-$C_{20}$-arylalkyl, $C_7$-$C_{20}$-arylalkenyl, —SR", —PR"$_3$, —SiR"$_3$, —OSiR"$_3$, —NR"$_2$ or —CH$_2$—Y, wherein Y is $C_6$-$C_{20}$-aryl, $C_6$-$C_{20}$-heteroaryl, $C_1$-$C_{20}$-alkoxy, $C_6$-$C_{20}$-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R$^1$ can further be substituted e.g. with $C_1$-$C_{20}$-alkyl which may contain Si and/or O atoms;

n is 0, 1 or 2, e.g. 0 or 1,
m is 1, 2 or 3, e.g. 1 or 2,
q is 1, 2 or 3, e.g. 2 or 3,
wherein m+q is equal to the valency of M.

Suitably, in each X as —CH$_2$—Y, each Y is independently selected from $C_6$-$C_{20}$-aryl, NR"$_2$, —SiR"$_3$ or —OSiR"$_3$. Most preferably, X as —CH$_2$—Y is benzyl. Each X other than —CH$_2$—Y is independently halogen, $C_1$-$C_{20}$-alkyl, $C_1$-$C_{20}$-alkoxy, $C_6$-$C_{20}$-aryl, $C_7$-$C_{20}$-arylalkenyl or —NR"$_2$ as defined above, e.g. —N($C_1$-$C_{20}$-alkyl)$_2$.

Preferably, q is 2, each X is halogen or —CH$_2$—Y, and each Y is independently as defined above.

Cp is preferably cyclopentadienyl, indenyl, tetrahydroindenyl or fluorenyl, optionally substituted as defined above.

In a suitable subgroup of the compounds of formula II, each Cp independently bears 1, 2, 3 or 4 substituents as defined above, preferably 1, 2 or 3, such as 1 or 2 substituents, which are preferably selected from $C_1$-$C_{20}$-alkyl, $C_6$-$C_{20}$-aryl, $C_7$-$C_{20}$-arylalkyl (wherein the aryl ring alone or as a part of a further moiety may further be substituted as indicated above), —OSiR"$_3$, wherein R" is as indicated above, preferably $C_1$-$C_{20}$-alkyl.

R, if present, is preferably a methylene, ethylene or a silyl bridge, whereby the silyl can be substituted as defined above, e.g. a (dimethyl)Si=, (methylphenyl)Si= or (trimethylsilylmethyl)Si=; n is 0 or 1; m is 2 and q is two. Preferably, R" is other than hydrogen.

A specific subgroup includes the well known metallocenes of Zr, Hf and Ti with two η-5-ligands which may be bridged or unbridged cyclopentadienyl ligands optionally substituted with e.g. siloxy, or alkyl (e.g. $C_{1-6}$-alkyl) as defined above, or with two unbridged or bridged indenyl ligands optionally substituted in any of the ring moieties with e.g. siloxy or alkyl as defined above, e.g. at 2-, 3-, 4- and/or 7-positions. Preferred bridges are ethylene or —SiMe$_2$.

The preparation of the metallocenes can be carried out according or analogously to the methods known from the literature and is within skills of a person skilled in the field. Thus for the preparation see e.g. EP-A-129 368, examples of compounds wherein the metal atom bears a —NR"$_2$ ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Alternatively, in a further subgroup of the metallocene compounds, the metal bears a Cp group as defined above and additionally a η1 or η2 ligand, wherein said ligands may or may not be bridged to each other. Such compounds are described e.g. in WO-A-9613529, the contents of which are incorporated herein by reference. Further preferred metallocenes include those of formula (I)

Cp'$_2$HfX'$_2$ wherein each X' is halogen, C$_{1-6}$ alkyl, benzyl or hydrogen;

Cp' is a cyclopentadienyl or indenyl group optionally substituted by a C$_{1-10}$ hydrocarbyl group or groups and being optionally bridged, e.g. via an ethylene or dimethylsilyl link.

Especially preferred catalysts are bis-(n-butyl cyclopentadienyl) hafnium dichloride, bis-(n-butyl cyclopentadienyl) zirconium dichloride and bis-(n-butyl cyclopentadienyl) hafnium dibenzyl, the last one being especially preferred.

Metallocene procatalysts are generally used as part of a catalyst system which also includes a catalyst activator, called also as cocatalyst. Useful activators are, among others, aluminium compounds, like aluminium alkoxy compounds. Suitable aluminium alkoxy activators are for example methylaluminoxane (MAO), hexaisobutylaluminoxane and tetraisobutylaluminoxane. In addition boron compounds (e.g. a fluoroboron compound such as triphenylpentafluoroboron or triphentylcarbenium tetraphenylpentafluoroborate (($C_6H_5$)$_3$B+B−($C_6F_5$)$_4$)) can be used as activators. The cocatalysts and activators and the preparation of such catalyst systems is well known in the field. For instance, when an aluminium alkoxy compound is used as an activator, the Al/M molar ratio of the catalyst system (Al is the aluminium from the activator and M is the transition metal from the transition metal complex) is suitable from 50 to 500 mol/mol, preferably from 100 to 400 mol/mol. Ratios below or above said ranges are also possible, but the above ranges are often the most useful.

If desired the procatalyst, procatalyst/cocatalyst mixture or a procatalyst/cocatalyst reaction product may be used in supported form (e.g. on a silica or alumina carrier), unsupported form or it may be precipitated and used as such. One feasible way for producing the catalyst system is based on the emulsion technology, wherein no external support is used, but the solid catalyst is formed from by solidification of catalyst droplets dispersed in a continuous phase. The solidification method and further feasible metallocenes are described e.g. in WO03/051934 which is incorporated herein as a reference.

It is also possible to use combinations of different activators and procatalysts. In addition additives and modifiers and the like can be used, as is known in the art.

Any catalytically active catalyst system including the procatalyst, e.g. metallocene complex, is referred herein as single site or metallocene catalyst (system).

Preparation of Cross-Linkable Polymer

For the preparation of the ethylene polymer of the present invention polymerisation methods well known to the skilled person may be used. It is within the scope of the invention for a multimodal, e.g. at least bimodal, polymer to be produced by blending each of the components in-situ during the polymerisation process thereof (so called in-situ process) or, alternatively, by blending mechanically two or more separately produced components in a manner known in the art. The multimodal polyethylene useful in the present invention is preferably obtained by in-situ blending in a multistage polymerisation process. Accordingly, polymers are obtained by in-situ blending in a multistage, i.e. two or more stage, polymerization process including solution, slurry and gas phase process, in any order. Whilst it is possible to use different single site catalysts in each stage of the process, it is preferred if the catalyst employed is the same in both stages.

Ideally therefore, the polyethylene polymer of the invention is produced in at least two-stage polymerization using the same single site catalyst. Thus, for example two slurry reactors or two gas phase reactors, or any combinations thereof, in any order can be employed. Preferably however, the polyethylene is made using a slurry polymerization in a loop reactor followed by a gas phase polymerization in a gas phase reactor.

A loop reactor—gas phase reactor system is well known as Borealis technology, i.e. as a BORSTAR™ reactor system. Such a multistage process is disclosed e.g. in EP517868.

The conditions used in such a process are well known. For slurry reactors, the reaction temperature will generally be in the range 60 to 110° C., e.g. 85-110° C., the reactor pressure will generally be in the range 5 to 80 bar, e.g. 50-65 bar, and the residence time will generally be in the range 0.3 to 5 hours, e.g. 0.5 to 2 hours. The diluent used will generally be an aliphatic hydrocarbon having a boiling point in the range −70 to +100° C., e.g. propane. In such reactors, polymerization may if desired be effected under supercritical conditions. Slurry polymerisation may also be carried out in bulk where the reaction medium is formed from the monomer being polymerised.

For gas phase reactors, the reaction temperature used will generally be in the range 60 to 115° C., e.g. 70 to 110° C., the reactor pressure will generally be in the range 10 to 25 bar, and the residence time will generally be 1 to 8 hours. The gas used will commonly be a non-reactive gas such as nitrogen or low boiling point hydrocarbons such as propane together with monomer, e.g. ethylene.

A chain-transfer agent, preferably hydrogen, can be added as required to the reactors. It is preferred if the amount of hydrogen used in the manufacture of the first component is very low. Preferably therefore, the amount is less than 1, preferably less than 0.5, e.g. 0.01 to 0.5 mol of H$_2$/kmoles of ethylene are added to the first, e.g. loop reactor.

The amount of hydrogen added to the second reactor, typically gas phase reactor is also quite low but is typically higher than the amounts added to the first reactor. Values may range from 0.05 to 1, e.g. 0.075 to 0.5, especially 0.1 to 0.4 moles of H$_2$/kmoles of ethylene.

The ethylene concentration in the first, preferably loop, reactor may be around 5 to 15 mol %, e.g. 7.5 to 12 mol %.

In the second, preferably gas phase, reactor, ethylene concentration is preferably much higher, e.g. at least 40 mol % such as 45 to 65 mol %, preferably 50 to 60 mol %.

Preferably, the first polymer fraction is produced in a continuously operating loop reactor where ethylene is polymerised in the presence of a polymerization catalyst as stated above and a chain transfer agent such as hydrogen. The diluent is typically an inert aliphatic hydrocarbon, preferably isobutane or propane. The reaction product is then transferred, preferably to continuously operating gas phase reactor. The second component can then be formed in a gas phase reactor using preferably the same catalyst.

A prepolymerisation step may precede the actual polymerisation process.

Where a unimodal polymer is used, this can be one formed in one stage of the process described above, e.g. the polymer formed in the loop reactor.

The ethylene polymer of the invention can be blended with any other polymer of interest or used on its own as the only olefinic material in an article. Thus, the ethylene polymer of the invention can be blended with known HDPE, MDPE, LDPE, LLDPE polymers or a mixture of ethylene polymers of the invention could be used. Ideally however any article made from the ethylene polymer is the invention consists essentially of the polymer, i.e. contains the ethylene polymer along with standard polymer additives only.

The ethylene polymer of the invention may be blended with standard additives, fillers and adjuvants known in the art. It may also contain additional polymers, such as carrier polymers of the additive masterbatches. Preferably the ethylene polymer comprises at least 50% by weight of any polymer composition containing the ethylene polymer, preferably from 80 to 100% by weight and more preferably from 85 to 100% by weight, based on the total weight of the composition.

Suitable antioxidants and stabilizers are, for instance, sterically hindered phenols, phosphates or phosphonites, sulphur containing antioxidants, alkyl radical scavengers, aromatic amines, hindered amine stabilizers and the blends containing compounds from two or more of the above-mentioned groups.

Examples of sterically hindered phenols are, among others, 2,6-di-tert-butyl-4-methyl phenol (sold, e.g., by Degussa under a trade name of Ionol CP), pentaerythrityl-tetrakis(3-(3',5'-di-tert. butyl-4-hydroxyphenyl)-propionate (sold, e.g., by Ciba Specialty Chemicals under the trade name of Irganox 1010) octadecyl-3-3(3'5'-di-tert-butyl-4'-hydroxyphenyl)propionate (sold, e.g., by Ciba Specialty Chemicals under the trade name of Irganox 1076) and 2,5,7,8-tetramethyl-2(4',8',12'-trimethyltridecyl)chroman-6-ol (sold, e.g., by BASF under the trade name of Alpha-Tocopherol).

Examples of phosphates and phosphonites are tris (2,4-di-t-butylphenyl) phosphite (sold, e.g., by Ciba Specialty Chemicals under the trade name of Irgafos 168), tetrakis-(2,4-di-t-butylphenyl)-4,4'-biphenylen-di-phosphonite (sold, e.g., by Ciba Specialty Chemicals under the trade name of Irgafos P-EPQ) and tris-(nonylphenyl)phosphate (sold, e.g., by Dover Chemical under the trade name of Doverphos HiPure 4).

Examples of sulphur-containing antioxidants are dilaurylthiodipropionate (sold, e.g., by Ciba Specialty Chemicals under the trade name of Irganox PS 800), and distearylthiodipropionate (sold, e.g., by Chemtura under the trade name of Lowinox DSTDB).

Examples of nitrogen-containing antioxidants are 4,4'-bis (1,1'-dimethylbenzyl) diphenylamine (sold, e.g., by Chemtura under the trade name of Naugard 445), polymer of 2,2,4-trimethyl-1,2-dihydroquinoline (sold, e.g., by Chemtura under the trade name of Naugard EL-17), p-(p-toluene-sulfonylamido)-diphenylamine (sold, e.g., by Chemtura under the trade name of Naugard SA) and N,N'-diphenyl-p-phenylene-diamine (sold, e.g., by Chemtura under the trade name of Naugard J).

Commercially available blends of antioxidants and process stabilizers are also available, such as Irganox B225, Irganox B215 and Irganox B561 marketed by Ciba-Specialty.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch where it is premixed with a polymer, preferably high density polyethylene (HDPE), in a specific amount. Suitable masterbatches are, among others, HD4394, sold by Cabot Corporation, and PPM1805 by Poly Plast Muller. Also titanium dioxide may be used as an UV-screener.

Pipe

The ethylene polymer used in the invention is cross-linkable and can be converted into a cross-linked pipe. The ethylene polymer used in the invention is particularly well suited for extruding pipes, especially pipes for transportation of fluids under pressure, such as water and gas.

Cross-linking of the polymer/pipe can be achieved in conventional ways e.g. using peroxide, irradiation or silane cross-linkers. In peroxide crosslinking, the crosslinking takes place by the addition of peroxide compounds, such as dicumyl peroxide, which form free radicals. Cross-linking can also be achieved by irradiation or using silanes. Ideally peroxide or irradiation is employed, especially irradiation. Preferably, silane cross-linking is not used. The pipes of the invention are preferably PEXc pipes.

Irradiation cross-linking is preferred, and can be carried out by firing an electron beam onto the formed pipe. The dose used can vary but suitable doses include 100 to 200 kGy, e.g. 150 to 200 kGy. Particular doses of interest are 160 kGy and 190 kGy.

At a predetermined amount of peroxide or irradiation, a lower molecular weight (higher MFR) polymer may be used than in the prior art. According to the present invention the absence of very low molecular weight tail in single-site catalyst polymers results in improved crosslinkability.

The pipes of the invention can exhibit a cross-linking degree of at least 60%, e.g. at least 70%. In particular, the pipes of the invention may have a degree of crosslinking ≥60% at 160 kGy as measured by the method described below.

Pipes according to the present invention are produced according to the methods known in the art. Thus, according to one preferred method the polymer composition is extruded through an annular die to a desired internal diameter, after which the polymer composition is cooled.

The pipe extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). The inside of the extrudate is pressurised so that the plastic is pressed against the wall of the tube. The tube is cooled by using a jacket or by passing cold water over it.

According to another method a water-cooled extension is attached to the end of the die mandrel. The extension is thermally insulated from the die mandrel and is cooled by water circulated through the die mandrel. The extrudate is drawn over the mandrel which determines the shape of the pipe and holds it in shape during cooling. Cold water is flowed over the outside pipe surface for cooling.

According to still another method the extrudate leaving the die is directed into a tube having perforated section in the centre. A slight vacuum is drawn through the perforation to hold the pipe against the walls of the sizing chamber.

After the sizing the pipe is cooled, typically in a water bath having a length of about 5 meters or more.

The pipes according to the present invention preferably fulfil the requirements of PE80 and PE100 standard as defined in EN 12201 and EN 1555, alternatively ISO 4427 and ISO 4437, evaluated according to ISO 9080. Especially preferably the pipes fulfil EN ISO 15875.

The pipes obtained by the manufacturing process according to the invention have a long-term pressure resistance which allows them to be assigned the MRS classification MRS 10 according to the ISO 9080 standard.

The pipes of the invention exhibit a pressure test performance at 4.8 MPa and 95° C. of at least 500 h, e.g. at least 650 h, especially at least 750 h. The pipes of the invention may exhibit pressure test performance at 12.4 MPa and 20° C. of at least 500 h, preferably at least 650 h, especially at least 700 h. Pressure test performance is measured according to ISO1167. In particular, the pipes of the invention when maunufactured and cross-linked according to the protocols below under the title "cross-linking by irradiation" exhibit the required pressure test performance.

The pipes obtained by the manufacturing process according to the invention are also characterized by good resistance to rapid crack propagation (RCP), good pressure resistance, good thermal stability, good resistance to gas condensates, good chemical resistance and good abrasion resistance.

The invention therefore also relates to the pipes, more particularly the pipes for the transportation of fluids under pressure, which can be obtained by the manufacturing process according to the invention.

The pipes according to the invention are consequently very suitable for the transportation of fluids under pressure, such as water and gas. They can be used over very wide temperature ranges, wider than for uncrosslinked polyethylene pipes. The pipes according to the invention can be used for the distribution of mains hot water.

Generally, polymer pipes are manufactured by extrusion. A conventional plant for screw extrusion of PEX polymer pipes comprises a single or double screw extruder, a nozzle, a calibrating device, cooling equipment, a pulling device, and a device for cutting or for coiling-up the pipe. The polymer is extruded into a pipe from the extruder and thereafter the pipe is crosslinked. This screw extrusion technique is well known to the skilled person and no further particulars should therefore be necessary here. The ethylene polymers of the invention are particularly suitable for screw extrusion.

The high cross-linking degree and other properties of the ethylene polymer of the invention allow the formation of articles, in particular pipes, which have excellent surface quality, i.e. are free from blemishes and are smooth to the touch.

The pipes of the invention are particularly suited to carrying water, especially hot water. Ideally, the pipes of the invention are PEXc pipes.

It will be appreciated that the preferred features of the polymers of the invention as described herein can all be combined with each other in any way.

The invention will now be described with reference to the following non limiting examples.

Analytical Tests

Melt Flow Rate

The melt flow rate (MFR) is determined according to ISO 1133 and is indicated in g/10 min. The MFR is an indication of the melt viscosity of the polymer. The MFR is determined at 190° C. for polyethylene. The load under which the melt flow rate is determined is usually indicated as a subscript, for instance $MFR_2$ is measured under 2.16 kg load (condition D), $MFR_5$ is measured under 5 kg load (condition T) or $MFR_{21}$ is measured under 21.6 kg load (condition G).

The quantity FRR (flow rate ratio) is an indication of molecular weight distribution and denotes the ratio of flow rates at different loads. Thus, $FRR_{21/2}$ denotes the value of $MFR_{21}/MFR_2$.

Density

Density of the polymer was measured according to ISO 1183/1872-2B.

For the purpose of this invention the density of the blend can be calculated from the densities of the components according to:

$$\rho_b = \sum_i w_i \cdot \rho_i$$

where $\rho_b$ is the density of the blend,
$w_i$ is the weight fraction of component "i" in the blend and
$\rho_i$ is the density of the component "i".

Molecular Weight $M_w$, $M_n$ and MWD are measured by Gel Permeation Chromatography (GPC) according to the following method:

The weight average molecular weight $M_w$ and the molecular weight distribution ($MWD=M_w/M_n$ wherein $M_n$ is the number average molecular weight and $M_w$ is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 µL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend, $w_i$ is the weight fraction of component "i" in the blend and $Mw_i$ is the weight average molecular weight of the component "i".

The number average molecular weight can be calculated using the well-known mixing rule:

$$\frac{1}{Mn_b} = \sum_i \frac{w_i}{Mn_i}$$

where $Mn_b$ is the weight average molecular weight of the blend, $w_i$ is the weight fraction of component "i" in the blend and $Mn_i$ is the weight average molecular weight of the component "i".

Rheology

Rheological parameters such as Shear Thinning Index SHI and Viscosity are determined by using a rheometer, preferably a Anton Paar Physica MCR 300 Rheometer on compression moulded samples under nitrogen atmosphere at 190° C. using 25 mm diameter plates and plate and plate geometry with a 1.8 mm gap according to ASTM 1440-95. The oscillatory shear experiments were done within the linear viscosity range of strain at frequencies from 0.05 to 300 rad/s (ISO 6721-1). Five measurement points per decade were made. The method is described in detail in WO00/22040.

The values of storage modulus (G'), loss modulus (G") complex modulus (G*) and complex viscosity ($\eta^*$) were obtained as a function of frequency ($\omega$).

Shear thinning index (SHI), which correlates with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.).

SHI value is obtained by calculating the complex viscosities at given values of complex modulus and calculating the ratio of the two viscosities. For example, using the values of complex modulus of 2.7 kPa and 210 kPa, then $\eta^*_{2.7}$ and $\eta^*(210 \text{ kPa})$ are obtained at a constant value of complex modulus of 2.7 kPa and 210 kPa, respectively. The shear thinning index $SHI_{2.7/210}$ is then defined as the ratio of the two viscosities $\eta^*_{2.7}$ and $\eta^*(210 \text{ kPa})$, i.e. $\eta(2.7)/\eta(210)$.

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Ash Content

A cross-linked polyethylene pipe can contain an ash content of less than 250 ppm. For ash content <1000 ppm the so called "burning method" is employed.

Heat up two clean platinum cups at 870° C. for 15 minutes and afterwards cool them to room temperature in an desiccator Measure weight of the cups directly from the desiccator to 0.1 mg.

Weight 15 g of polymer powder into the platinum cups (to 0.1 mg), (after sieving the powder).

Burn up this powder in an burning device until all material has burnt, i.e. until flame dies.

Place the cups in a burning oven at 870° C. for 45 minutes.

Cool the cups in an desiccator to room temperature and measure the weight of the cups to 0.1 mg.

The weight of the ash content is the weight of the cup with ash content minus the weight of the empty cup.

Ash content calculation: (gram ash/gram polymer sample)* 100=weight % ash content Crosslinking by Irradiation Polymer powders were compounded and pelletised in a Buss 100 mm machine. Pipe extrusion was carried out in a Battenfeld extruder using a standard PE screw. Melt temperature was in the range 200 to 230° C. Pipe dimensions were 20×2 mm (OD×S). Irradiation of pipes was carried out by electron beam at room temperature in air using a dose of 160 kGy or 190 kGy. One Gy corresponds to an energy absorption of 1 Joule/kg.

Degree of Crosslinking, XL %

XL % was measured by decaline extraction (Measured according to ASTM D 2765-01, Method A)

Pressure Testing

Was carried out based on ISO1167

Preparation Example 1

Preparation of the Catalyst 1

The catalyst complex used in the polymerisation examples was bis(n-butylcyclopentadienyl) hafnium dibenzyl, $(n\text{-BuCp})_2\text{Hf}(CH_2Ph)_2$, and it was prepared according to "Catalyst Preparation Example 2" of WO2005/002744, starting from bis(n-butylcyclopentadienyl) hafnium dichloride (supplied by Witco).

The catalyst preparation was made in a 160 L batch reactor into which a metallocene complex solution was added. Mixing speed was 40 rpm during reaction and 20 rpm during drying. Reactor was carefully flushed with toluene prior to reaction and purged with nitrogen after silica addition Activated Catalyst System 10.0 kg activated silica (commercial silica carrier, XPO2485A, having an average particle size 20 μm, supplier: Grace) was slurried into 21.7 kg dry toluene at room temperature. Then the silica slurry was added to 14.8 kg of 30 wt % methylalumoxane in toluene (MAO, supplied by Albemarle) over 3 hours. Afterwards the MAO/silica mixture was heated to 79° C. for 6 hours and then cooled down to room temperature again.

The resulting solution was reacted with 0.33 kg of $(n\text{-BuCp})_2\text{Hf}(CH_2Ph)_2$ in toluene (67.9 wt %) for 8 hours at room temperature.

The catalyst was dried under nitrogen purge for 5.5 hours at 50° C.

The obtained catalyst had an Al/Hf mol-ratio of 200, an Hf-concentration of 0.44 wt % and an Al-concentration of 13.2 wt %.

Preparation of Catalyst 2

The second catalyst system is based on complex bis(n-butyl-cyclopentadienyl)hafnium dibenzyl $(n\text{-BuCp})_2\text{HfBz}_2$.

The catalyst system is prepared according to the principles disclosed in WO03/051934.

In a jacketed 90 dm³ glass-lined stainless steel reactor the complex solution was prepared at −5° C. adding 1.26 kg of a 24.5 wt % PFPO ((2,2,3,3,4,4,5,5,6,6,7,7,8,8,9,9,9-heptadecafluorononyl)oxirane)/toluene solution very slowly (3.4 ml/min) to 20 kg 30 wt % methylaluminoxane/toluene solution. The temperature was increased to 25° C. and the solution was stirred for 60 minutes. After addition of 253 g of complex (Hf-content 78.8 w % in toluene) the solution was stirred for an additional two hours. That mixture was pumped at 5 l/h to the rotor stator with the rotor stator pair 4 M. In the rotor stator with a tip speed of 4 m/s the mixture was mixed with a flow of 32 l/h of PFC (hexadecafluoro-1,3-dimethylcyclohexane) thus forming an emulsion. The droplets in the emulsion were solidified by an excess flow of 450 l/h PFC at a temperature of 60° C. in a Teflon hose. The hose was connected to a jacketed 160 dm³ stainless steel reactor equipped with a helical mixing element. In this reactor the catalyst particles were separated from the PFC by density difference. After the complex solution had been utilised the catalyst particles were dried in the 160 dm³ reactor at a temperature of 70° C. and a nitrogen flow of 5 kg/h for 4 h.

The obtained catalyst had an Al/Mt ratio of 300; Hf-content of 0.7 wt %; and an Al-content of 34.4 wt %.

Polymerisation Examples

Two-Stage Polymerisation

A loop reactor having a volume of 500 dm³ was operated at a temperature and pressure indicated in Table 1. Into the reactor were introduced propane diluent, hydrogen and ethylene. In addition, polymerisation catalyst prepared according to the description above was introduced into the reactor continuously continuously into the reactor so that the polymerisation rate was as shown in Table 1.

The polymer slurry was withdrawn from the loop reactor and transferred into a flash vessel operated at 3 bar pressure and 70° C. temperature where the hydrocarbons were substantially removed from the polymer. The polymer was then introduced into a gas phase reactor operated at a temperature of 80° C. and a pressure of 20 bar. In addition ethylene and hydrogen were introduced into the reactor. The conditions are shown in Table 1.

|  |  | Polymer 1 | Polymer 2 |
|---|---|---|---|
| catalyst type | type | Cat 1 | Cat 2 |
| LOOP PREPOLY |  |  |  |
| temperature | ° C. | Not | 80 |
| pressure | bar | in | 63 |
| catalyst feed | g/h | use | 15 |
| C$_2$ feed | kg/h |  | 2.0 |
| H$_2$ feed | g/h |  | 0.7 |
| C$_4$ feed | g/h |  | 30.1 |
| C$_3$ feed | kg/h |  | 50 |
| production rate | kg/h |  | 1.9 |
| LOOP |  |  |  |
| temperature | ° C. | 85 | 80 |
| pressure | bar | 58 | 60 |
| C$_2$ feed | kg/h | 36 | 39 |
| H$_2$ feed (formier 25%) | g/h | 15.9 | 0.7 |
| C$_2$ concentration | mol-% | 10.4 | 12.9 |
| H$_2$/C$_2$ ratio | mol/kmol | 0.17 | 0.06 |
| production rate | kg/h | 30.2 | 29.8 |
| MFR$_2$ | g/10 min | 9.9 |  |

-continued

|  |  | Polymer 1 | Polymer 2 |
|---|---|---|---|
| MFR$_{21}$ | g/10 min |  | 5.7 |
| density | kg/m³ | 963 | 947 |
| ash content | Ppm | 455 | 360 |
| GPR | - |  |  |
| temperature | ° C. | 80 | 80 |
| pressure | Bar | 20 | 20 |
| C$_2$ feed | kg/h | 90.1 | 113.8 |
| H$_2$ feed (formier 25%) | g/h | 4.5 | 4.4 |
| C$_2$ conc. | mol-% | 56 | 57 |
| H$_2$/C$_2$ ratio | mol/kmol | 0.15 | 0.18 |
| production rate | kg/h | 31 | 41 |
| split (mass balance) | wt-% | 46 | 47.9 |
| ash content | ppm | 180 | 90 |

Formier gas 25% is a 25 mol % hydrogen in nitrogen mixture.

The polymers were received as powders. The properties of the formed polymers, and crosslinked pipe are reported in Table 2.

TABLE 2

|  | Polymer 1 | Polymer 2 |
|---|---|---|
| Density (kg/m³) | 955.7 | 949.8 |
| η*$_{0.05\ rad/s}$ (Pas) | 29650 | 41000 |
| η*$_{2.7\ kPa}$ (Pas) | 27550 | 39200 |
| MFR$_{21}$ (g/10 min) | 8.3 | 3.7 |
| MFR$_5$ (g/10 min) | 0.91 | 0.5 |
| M$_w$ (g/mol) | 182000 |  |
| M$_n$ (g/mol) | 37400 |  |
| M$_w$/M$_n$ | 4.9 |  |
| SHI$_{5/300}$ | 6.7 | 3.3 |
| SHI$_{2.7/210}$ | 4.3 | 2.7 |
| Pipe properties |  |  |
| 20° C./12.4 MPa (h) | 736 | >1200 |
| 95° C./4.8 MPa (h) | 813 | >1488 |
| XL % (irrad 160 kGy) | 62.0 | 73.3 |
| XL % (irrad 190 kGy) | 64.7 | 76.6 |

What is claimed is:

1. A cross-linked polyethylene pipe comprising a multimodal ethylene homopolymer with a density of at least 950 kg/m³ obtained by polymerization with a single-site catalyst only and comprising:
  a shear thinning index SHI$_{2.7/210}$ of less than 10;
  an ash content of less than 250 ppm, and
  wherein said pipe comprises a pressure test performance at 4.8 MPa and 95° C. of at least 500 h and at 12.4 MPa and 20° C. of at least 500 h,
  wherein said multimodal ethylene homopolymer is not cross-linked with silane,
  wherein the multimodal ethylene homopolymer consists of a bimodal ethylene homopolymer, and
  wherein the multimodal ethylene homopolymer is the only olefinic material in the cross-linked polyethylene pipe.

2. The cross-linked polyethylene pipe as claimed in claim 1, wherein the density of the bimodal ethylene homopolymer is in the range of more than 950 kg/m³ to 958 kg/m³.

3. The cross-linked polyethylene pipe as claimed in claim 1, wherein the bimodal ethylene homopolymer comprises an SHI$_{2.7/210}$ of less than 5.

4. The cross-linked polyethylene pipe as claimed in claim 1, wherein the bimodal ethylene homopolymer comprises an MFR$_{21}$ of 2 to 10 g/10 min.

5. The cross-linked polyethylene pipe as claimed in claim 1 comprising a cross-linking degree of at least 60%.

6. The cross-linked polyethylene pipe as claimed in claim 1 comprising a pressure test performance at 4.8 MPa and 95° C. of at least 750 h and at 12.4 MPa and 20° C. of at least 700 h.

7. The cross-linked polyethylene pipe as claimed in claim 1, wherein the bimodal ethylene homopolymer is made in a multistage process.

8. The cross-linked polyethylene pipe as claimed in claim 1, wherein the bimodal ethylene homopolymer is cross-linked by irradiation.

* * * * *

UNITED STATES PATENT AND TRADEMARK OFFICE
CERTIFICATE OF CORRECTION

PATENT NO. : 10,082,228 B2
APPLICATION NO. : 13/127036
DATED : September 25, 2018
INVENTOR(S) : Anneli Pakkanen et al.

Page 1 of 1

It is certified that error appears in the above-identified patent and that said Letters Patent is hereby corrected as shown below:

In the Specification

In Column 7, Lines 4-5, delete "Further preferred metallocenes include those of formula (I)" and insert the same on Column 7, Line 5, as a new paragraph In Column 7, Line 25, change "triphentylcarbenium" to --triphenylcarbenium--

In Column 9, Line 25, change "tert. butyl" to --tert.butyl- --

In Column 9, Line 36, change "biphenylen" to --biphenylene--

In Column 9, Line 45, change "DSTDB)." to --DSTDP).--

In Column 11, Line 25 (Approx.), change "maunufactured" to --manufactured--

In Column 13, Lines 66-67, change "desiccator" to --desiccator.--

In Column 14, Line 14 (Approx.), change "content" to --content.--

In Column 14, Line 26, change "decaline" to --decalin--

In Column 14, Lines 45-46, change "addition" to --addition.--

In Column 14, Line 52 (Approx.), change "methylalumoxane" to --methylaluminoxane--

In Column 15, Line 37, change "continuously continuously" to --continuously--

Signed and Sealed this
Twenty-sixth Day of March, 2019

Andrei Iancu
*Director of the United States Patent and Trademark Office*